United States Patent [19]

Pomikacsek

[11] Patent Number: 4,856,948
[45] Date of Patent: Aug. 15, 1989

[54] MILLING DEVICE FOR WORKING, AND IN PARTICULAR FOR TRIMMING THE EDGES OF SHEET METAL STRIPS, SHEET METAL PLATES OR THE LIKE

[75] Inventor: Josef Pomikacsek, Gmunden, Austria

[73] Assignee: Linsinger Maschinenbau GmbH, Steyrermühl, Austria

[21] Appl. No.: 117,866

[22] Filed: Nov. 9, 1987

[30] Foreign Application Priority Data

Nov. 7, 1986 [DE] Fed. Rep. of Germany ....... 3638068

[51] Int. Cl.4 .............................................. B23C 3/12
[52] U.S. Cl. ..................................... 409/138; 83/869
[58] Field of Search ................... 409/137, 138, 139; 83/432, 869; 407/7

[56] References Cited

U.S. PATENT DOCUMENTS

| 2,003,049 | 5/1935 | Hull | 83/432 |
| 3,117,477 | 1/1964 | Cardell | 409/138 |
| 3,377,896 | 4/1968 | De Corta | 409/138 |
| 3,515,029 | 6/1970 | Gambini | 409/138 |
| 4,604,011 | 8/1986 | Rungger et al. | 409/138 |
| 4,616,966 | 10/1986 | Ohyama | 409/138 |

FOREIGN PATENT DOCUMENTS

| 1502100 | 3/1969 | Fed. Rep. of Germany . |
| 3400661 | 10/1985 | Fed. Rep. of Germany . |
| 20811 | 2/1985 | Japan | 409/138 |
| 476103 | 10/1975 | U.S.S.R. | 83/869 |
| 757265 | 8/1980 | U.S.S.R. | 409/138 |

Primary Examiner—Gil Weidenfeld
Assistant Examiner—Daniel W. Howell
Attorney, Agent, or Firm—Browdy and Neimark

[57] ABSTRACT

A milling device for working, and particularly for trimming the edges, of sheet metal strips, sheet metal plates, and the like. The workpiece is movable in any desired shape or direction in relation to the working position between guide rollers. The milling device has a cutter head which can be turned by a motor. The rotational axis of the cutter head is located approximately parallel to the plane of the workpiece and approximately vertical to the direction of advancement of the device. The device is provided with at least one cutter element provided with a cutting edge inclined at an angle to the normal plane of the cutter head.

6 Claims, 1 Drawing Sheet

MILLING DEVICE FOR WORKING, AND IN PARTICULAR FOR TRIMMING THE EDGES OF SHEET METAL STRIPS, SHEET METAL PLATES OR THE LIKE

FIELD OF THE INVENTION

The invention relates to a milling device for working, and in particular trimming the edges of sheet metal strips, sheet metal plates or the like. The workpiece is movable in any desired shape or direction in relation to the working postion between guide rollers, having a cutter head which can be turned by a motor, the rotational axis of which is located approximately parallel to the plane of the workpiece and approximately vertical to the direction of advancement and which has at least one cutter element provided with a cutting edge inclined at an angle to the normal plane of the cutter head.

BACKGROUND OF THE INVENTION

A device for the milling of longitudinally extending areas, particularly of the edges of continuous metal strips or long rods, is known from German Published Application DE-AS No. 15 02 100, where the axis of a cutter head equipped with hard alloy cutters is inclined by an angle $\gamma$ in relation to the plane of the strip to be trimmed. The hard alloy cutters are also disposed inclined by the same angle $\gamma$ in relation to the normal plane of the cutter head. However, in this known device the individual cutting edges are formed in a straight line and by themselves cannot define a plane, i.e. no cutting edge plane can be defined in the sense of the subject of the present application. Furthermore, it is of importance that the inclination of the flank of a straight cutting edge such as in the device in accordance with DE-AS No. 15 02 100 cannot have any influence on the shape of a cutting arc. The shape of the elliptical cutting arc is determined by the angle $\gamma$ or, respectively, the rotational cone of the cutting generatrix of the cutting tool, the size of which can be different, depending on the radial distance of the point of contact of the cutting edge in reference to the rotational axis.

SUMMARY OF THE INVENTION

It is an object of the invention to improve a milling device for trimming the edges of sheet metal strips, plates, or the like, where the workpiece is movable in any desired shape or direction relative to the working position between guide rollers in such a way that a simple and cost-effective treatment of the edges of sheet metal strips, sheet metal plates or similar workpieces becomes possible while, at the same time, ensuring a large cutting output combined with small stresses on the cutting edges, self-sharpening effects on the cutting edges and a long edge life, as well as making possible the working of very hard austenitic materials.

This object is obtained by means of the device of the present invention.

In the milling device in accordance with the invention, the shape of the non-elliptical cutting arc is decisively influenced by the shape of the elliptical cutting generatrix. It is also possible to determine the shape and position of the activated arcuate generatrix of the cutting edge. Since the cutting directions of the individual cutting edge points practically have such small deviations in relation to the cutting edge plane, use of the cutting edge plane as flank is not possible. It follows from this that in the subject of the application the cutting edge plane 10 cannot be defined as the "flank of the round cutting insert".

Considerable differences from the known device are a result of the invention, not only in a structural view, but also—e.g., with the same dimensions of the cutter heads—in view of milling properties. During the working of the edges of sheet metal, for example, it is known that the direction of the milling forces should have only slight deviations from the sheet metal plane, because otherwise a plastic deformation of the edges may be caused by bending or the heavy vibrations may lead to breaking of the cutting edge. In a milling device according to the invention such disadvantages have been avoided from the start because of the constant direction of the milling forces, while in the subject of DE-AS No. 15 02 100 the direction of the milling forces can change depending on the angle of contact 2 $\phi$ of the cutting edges, resulting in the disadvantages described above.

In contrast thereto, long contact arcs with practically only small changes of the direction of the milling forces are made possible by means of the device of the present invention. With it considerably longer cutting edges can be used, thus resulting in considerably longer life with identical cutting speeds because of the smaller specific load.

A further advantage of the present invention resides in the fact that the contact point of the cutting edge is located at a comparatively small radial distance from the rotational axis, thus this cutting edge contact point will make contact with the material with less kinetic energy. During the subsequent work process, the cutting edge, which is in the form of a circular cutter, for example, is accelerated to a multiple of the contact speed of up to three-quarters of the length of the cut, after which it slows down again. In this manner, extraordinarily high average speeds can be attained during cutting.

In contrast to that, the circumferential speed of the contact point in the device according to DE-AS No. 15 02 100 is considerably higher, so that the attainable cutting speed is limited in relation to the dynamic load capacity of the operating cutting edge. This results in the disadvantages in regard to the productivity of the known device mentioned above.

The invention is described by means of an exemplary embodiment with the aid of the drawings.

DETAILED DESCRIPTION OF THE PREFERRED EMBODIMENT

Figure 1:
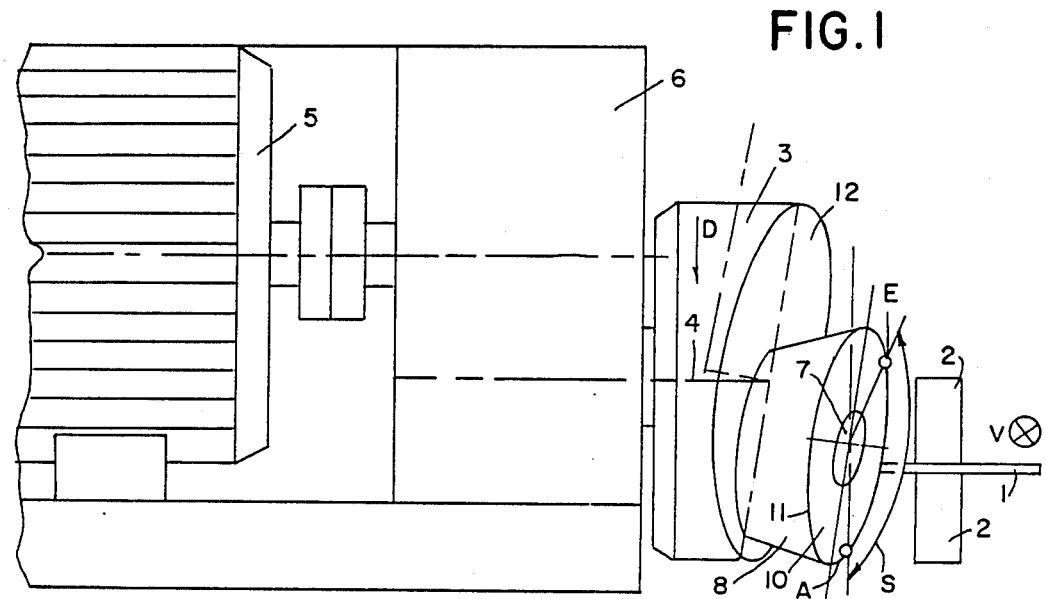
FIG. 1 is a schematic view of the subject of the invention in a side view.
Figure 2:
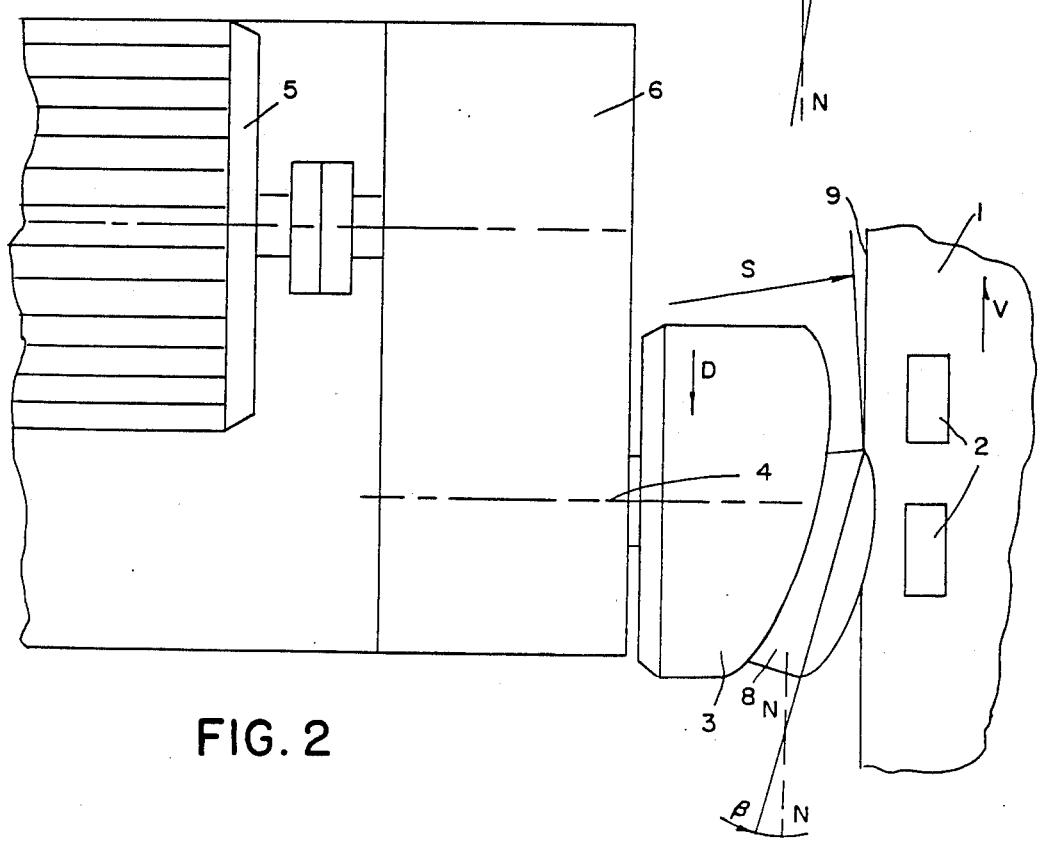
FIG. 2 is a top view of the invention.

In FIGS. 1, 2, a milling device for working a sheet metal edge 9 of a sheet metal strip 1 is shown being advanced in one direction, which is brought into the working position between guide rollers 2. Milling is performed with a cutter head 3, the rotational axis 4 of which is located approximately parallel to the plane of the sheet metal strip 1 as well as approximately vertical to the direction of advancement V. The cutter head 3 is rotated unidirectionally by means of an electric motor 5 and a drive unit 6. The cutter head 3 is equipped, via a fixed screw connection 7, with a cutting element 8, the cutting edge plane 10 of which is disposed inclined by two small angles $\alpha$ and $\beta$ in relation to the rotational plane NN being perpendicular to the cutter head rotational axis 4. The face of the cutter element 8 has a particular radius, and the center of the cutter edge face 10 is preferably located less than the distance of the particular radius from the rotational axis 4. As viewed in the direction of travel of strip 1, the face 10 forms an angle $\alpha$ with the plane N—N. As viewed perpendicularly to the direction of travel from above, the face 10 forms an angle $\beta$ with the plane N—N. In regard to the disposition of the cutter head 3 it is of advantage if the rotational axis 4 is disposed above or below the sheet metal plane by an amount corresponding to the cutter radius.

In this milling device the arcuate cutting edge 11 of the cutting element 8 contacts the sheet metal edge 9 with a contact arc $\phi$ constituting a large arc. The cutting edge becomes operational between a contact point E and a contact point A. In this manner a cutting edge segment S of the cutting element 8 can be brought to bear which corresponds to approximately one-half of the circumference. Because of the drawing cut thus created, a small load on the cutting edge and, at the same time and because of the large contact arc $\phi$, a large milling cut is achieved.

A particular milling advantage can also be achieved by the operational cutting edge, the contact point E of which is located near the rotational axis 4, having a slow speed. Thus a sudden load on the cutting edge 11 can be considerably reduced.

Further advantageous features can be achieved by using the cutter head 3 at small cutting depths. The amount of optimal milling thickness can be considered to be the advantageous cutting depth. It is possible in this manner to achieve high milling efficiency, that is, great comma factors, with particularly small milling devices. In order to make use of these features it is advantageous if greater cutting depths are worked in several milling stages. In order to eliminate the reactive milling forces acting on the workpiece, it is advantageous if the milling stages can be used alternatively running in the same and then in the opposite direction.

Use of a circular cutter, i.e. a cutting element having a single, convexly curved cutting edge 11, will also result in the advantage of being able to use the entire circumference of the cutting edge by loosening and advancing the used edges. In this way the circular cutter results in the optimal relationship between the desired small size of the cutter size and the long cutting edge.

Additionally, instead of one circular cutter on the cutting element 8, a plurality of arcuate or nearly arcuate cutting edge elements can be provided, the cutting edge planes 10 of which are inclined by two small angles and which each are defined by an entry point E and exit point A. In this embodiment all cutting segments of the cutting element 8 can advantageously have a shape identical to each other.

It is to be understood that the above described exemplary embodiments have been given by way of example only and that other embodiments and improvements are possible within the scope of the invention.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. A milling device for working and trimming the edges of sheet metal, said milling device being movable in any desired shape or direction relative to the working position between guide rollers, said device comprising:
   a cutter head turnable by a motor;
   said cutter head having a rotational axis, the rotational axis of said cutter head located approximately parallel to the plane of the workpiece and approximately vertical to the direction of advancement of the device;
   the device having at least one cutting element which is provided with a convex arcuate cutting edge and disposed on the front of the cutter head wherein the face of the cutter element has a particular radius, and the center of the cutting edge face is located less than the distance of the particular radius from the rotational axis;
   the cutting edge face forming an angle $\alpha$ with a plane which is perpendicular to the rotational axis of the cutter head, said angle $\alpha$ being viewed parallel to the direction of travel of the edge of the sheet metal;
   said cutting edge face also forming an angle $\beta$ with said plane which is perpendicular to the rotational axis of the cutter head, said angle $\beta$ being viewed perpendicularly to the direction of travel of the edge of the sheet metal from above;
   the rotating cutting edge having a contact point located close to the rotational axis and a contact point located at a greater radial distance, thereby creating a relatively long cutting edge segment for the creation of a drawing cut along the cutting edge segment and for working the workpiece along a large contact arc $\phi$.

2. A device in accordance with claim 1 wherein the cutter head has on a front end thereof at least one attachment surface for the cutting element, said surface being parallel to the cutting face.

3. A device in accordance with claim 1 wherein said convexly curved cutting edge of the cutting element is formed by a cutting edge having a plurality of cutting segments which are determined by an entry point and an exit point.

4. A device in accordance with claim 3 wherein all cutting segments of the cutting element have an identical shape.

5. A device in accordance with claim 4 wherein the cutting segments of the cutting element are in the form of a circle.

6. A cutting device in accordance with claim 4 wherein the cutting segments of the cutting element are in approximately the form of a circle.

* * * * *